Figure 1:
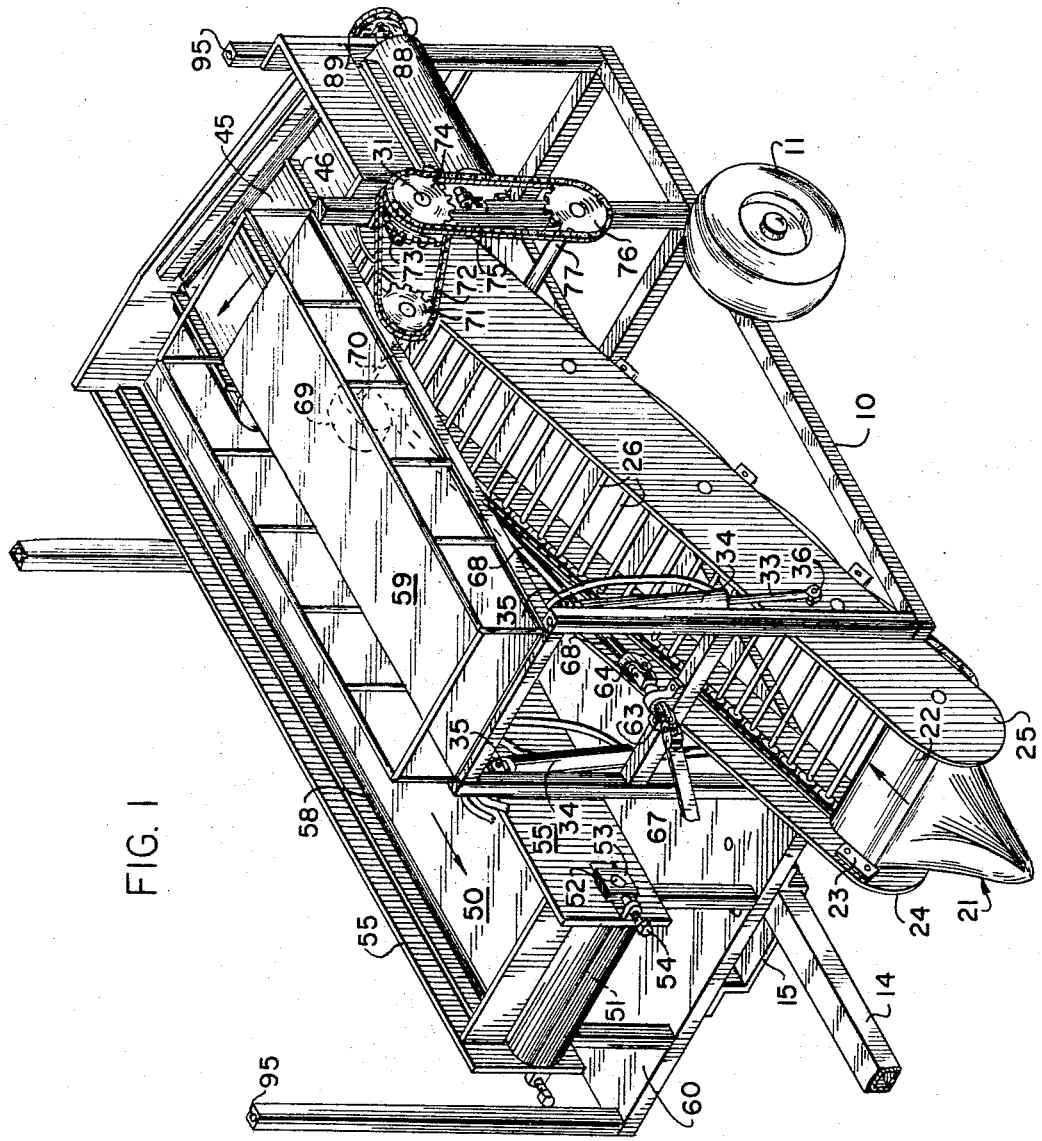

INVENTOR
SERVILLE LAVERGNE

Aug. 1, 1967  S. LAVERGNE  3,333,644
TUBER DIGGER
Filed July 22, 1964  4 Sheets-Sheet 2

INVENTOR
SERVILLE LAVERGNE
BY
ATTORNEYS

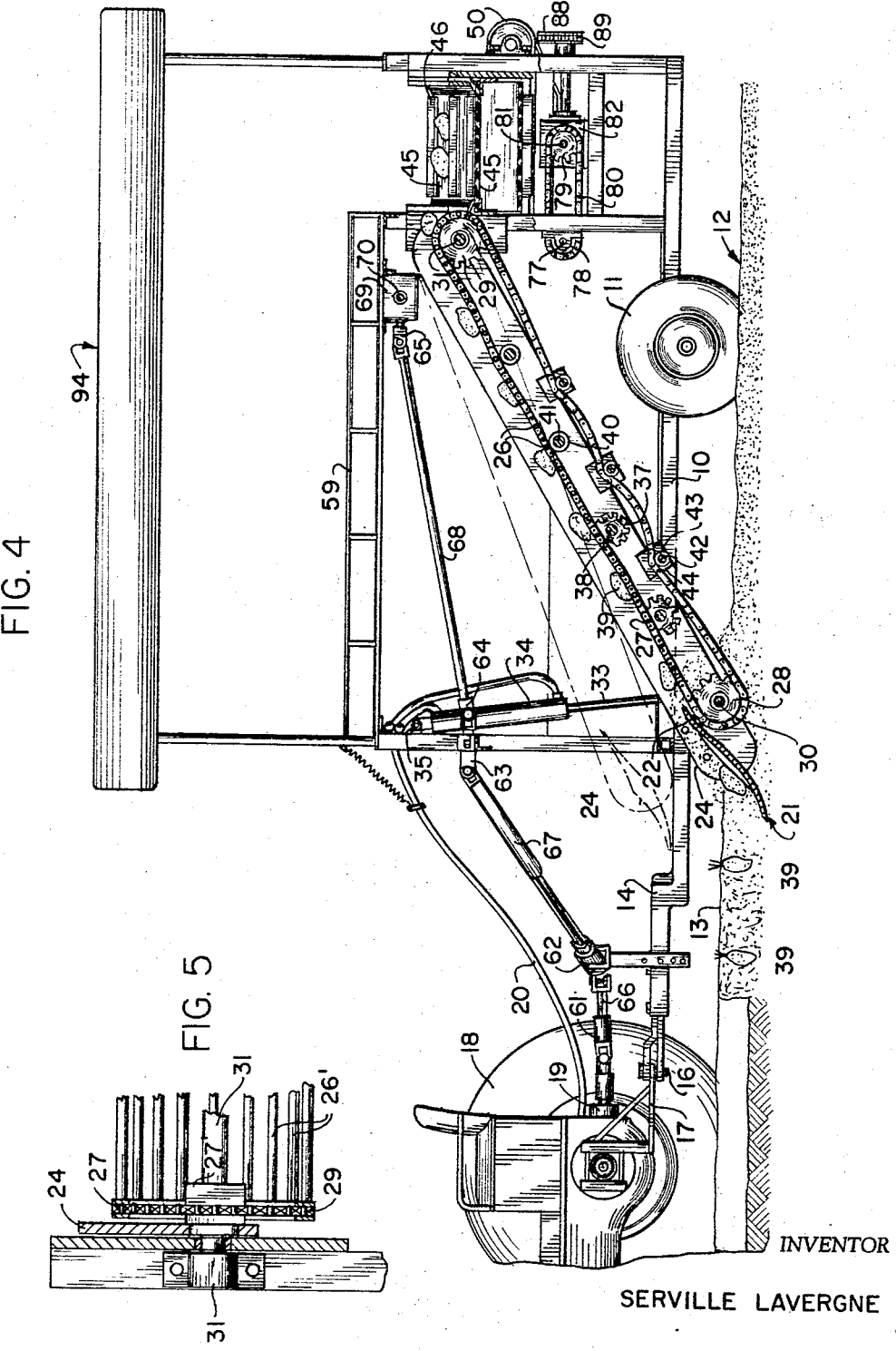

INVENTOR
SERVILLE LAVERGNE

BY
ATTORNEYS

United States Patent Office 3,333,644
Patented Aug. 1, 1967

3,333,644
TUBER DIGGER
Serville Lavergne, Rte. 1, Box 9, Sunset, La. 70584
Filed July 22, 1964, Ser. No. 384,390
1 Claim. (Cl. 171—130)

This invention relates to the planting, cultivating, harvesting, and packaging of crops of various kinds, including those which grow both above and below the surface of the soil, and to apparatus and equipment by which the several operations incident to such planting, cultivating, harvesting, and packaging are performed.

The invention relates particularly to a machine for digging, removing surplus earth, conveying, grading, and packaging sweet potatoes and other root crops or tubers or other loose products handled in large quantities on the farm and elsewhere, after which such sweet potatoes or other root crops or products are prepared for shipment and storage.

Labor saving machines of many kinds have been produced for use in the performance of various operations on farms and elsewhere but these machines have been complicated, of excessive size, required too much area in which to operate, were cumbersome, expensive, of limited use, or a construction to cause damage to the product, and were inefficient and did not satisfactorily perform the function for which they were intended.

It is an object of the invention to provide a labor-saving machine constructed to be driven from any desired source, as for example, by the attachment of the machine to a conventional tractor and driven from the power take-off thereof.

Another object of the invention is to provide a compact machine for digging, removing crops from the earth, conveying, grading and for holding boxes or crates for packaging sweet potatoes and other root crops or other tubers, and which machine includes a combination shaker and conveyor pivoted at one end and with the other end floating or riding upon the earth and hydraulically controlled with a blade or excavating member for digging into the earth.

Another object of the invention is to provide a machine of the character indicated having a combination digging, conveying and shaking member compactly arranged beside a grading conveyor with a platform for workmen at each side of the latter and transfer means therebetween, and a rack for crates or boxes into which the product is to be packed.

A further object of the invention is to provide a practical, inexpensive and labor-saving machine for digging root products, which machine includes a wheel supported frame with an inclined conveyor pivoted at its rear higher and with its front end carrying a blade or excavator in engagement with the soil and with guide means at each side thereof, and which conveyor includes spaced substantially parallel chains with crossbars and gearing supporting the upper rungs of said chains for imparting a shaking action thereto.

A still further object of the invention is to provide a combination digger and conveyor including cushioning means for preventing injury to the product.

A still further object of the invention is to provide a tuber digger having a frame of generally rectangular configuration with a digging and receiving conveyor on one side, a grading conveyor in generally parallel relation on the other side, an intermediate conveyor for transferring the product from the first to the second mentioned conveyor and with means for providing vibratory action to the first conveyor and lateral flexing to remove anything adhering to the second mentioned conveyor.

Figure 2:
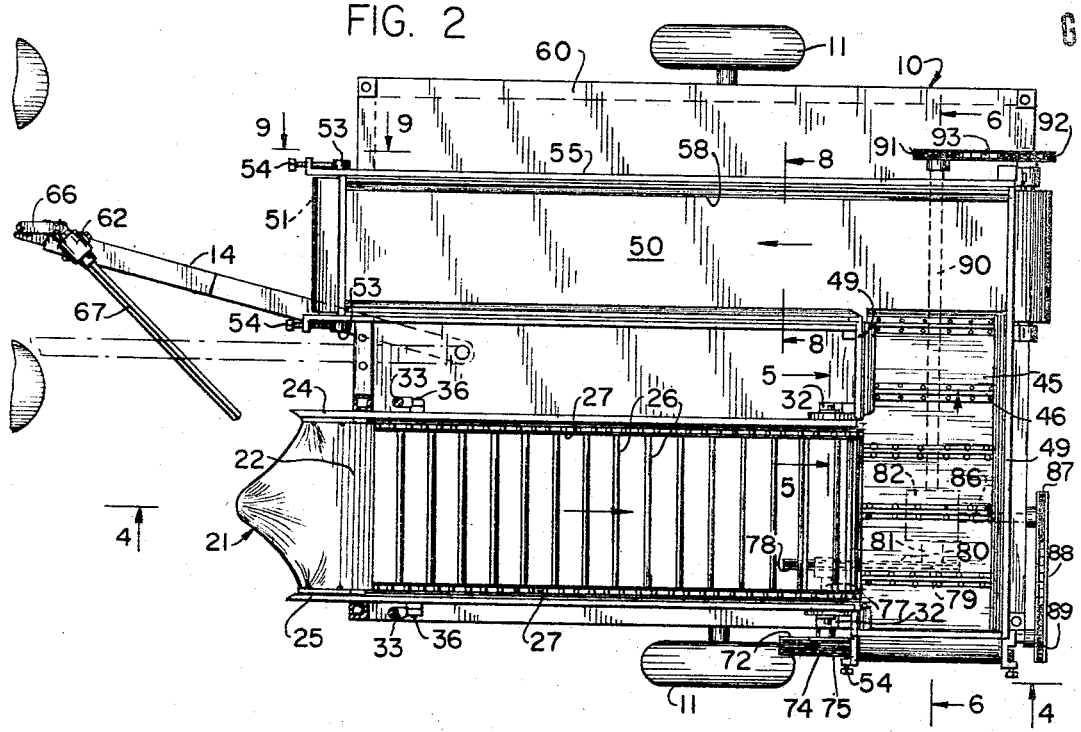
Figure 3:
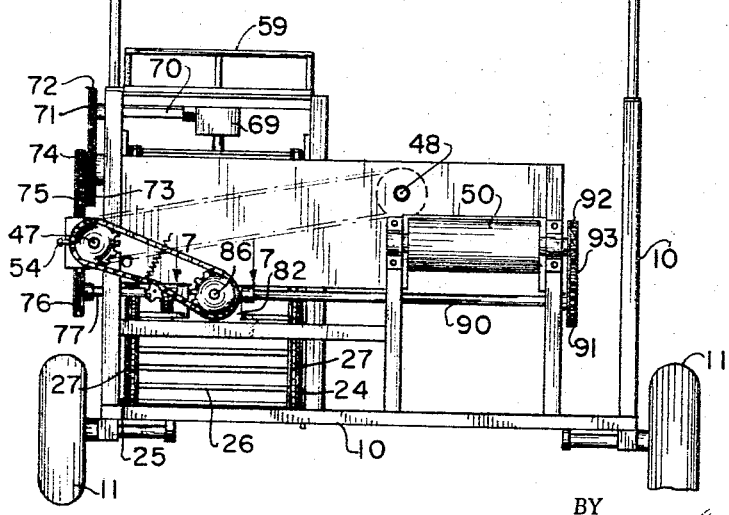
Figure 6:
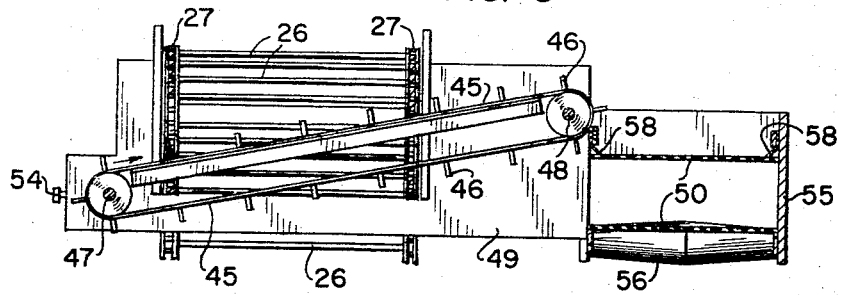
Figure 7:
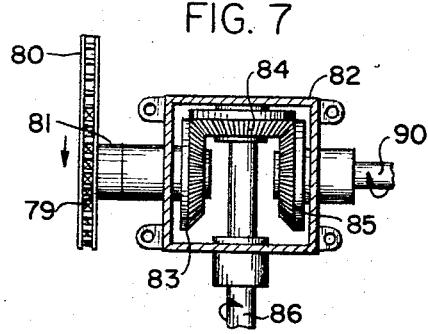
Figure 9:
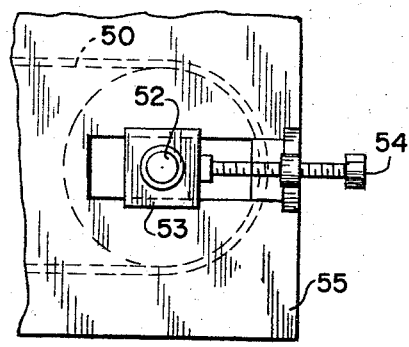
Figure 8:
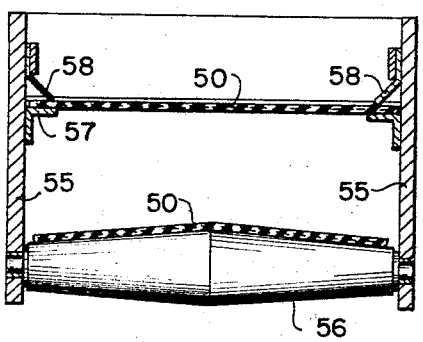
Figure 10:
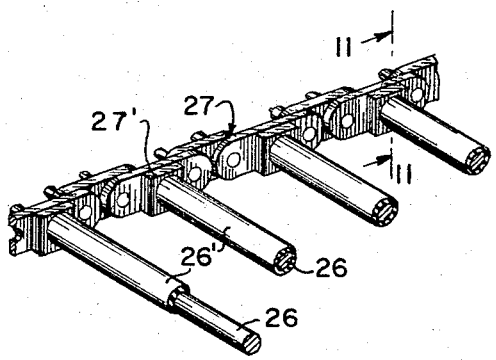
Figure 11:
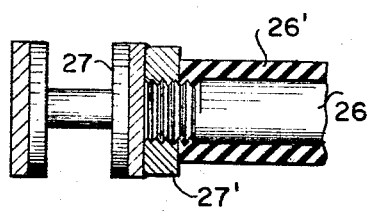

Other objects and advantages of the invention will be apparent from the following description taken in conjunction with the accompanying drawings in which:

FIG. 1 is a perspective illustrating one application of the invention;
FIG. 2, a top plan with the canopy cover removed;
FIG. 3, a rear elevation;
FIG. 4, a long section on the line 4—4 of FIG. 2;
FIG. 5, an enlarged fragmentary detail section on the line 5—5 of FIG. 2;
FIG. 6, an enlarged transverse section on the line 6—6 of FIG. 2;
FIG. 7, an enlarged fragmentary section on the line 7—7 of FIG. 3 (gearbox);
FIG. 8, an enlarged horizontal section on the line 8—8 of FIG. 2;
FIG. 9, an enlarged fragmentary elevation on the line 9—9 of FIG. 2;
FIG. 10, an enlarged fragmentary perspective of the chain conveyor; and,
FIG. 11, an enlarged fragmentary section on the line 11—11 of FIG. 10.

Briefly stated the invention is a sweet potato or other root digger having a ground wheel supported generally rectangular frame with means for attaching the same to a tractor and for operation from the power take-off. On the upper rear portion of the frame is pivotally mounted a conveyor having its forward end mounted to follow the contour of the terrain and provided with a digging blade, the conveyor being formed of spaced chains with spaced cross bars and with means for imparting a vibratory action to said spaced chains and cross bars for removing dirt from the product. A longitudinally disposed transverse conveyor is mounted in said frame, and supporting means is provided for workmen at each side of said grading conveyor, a lateral flexing means for the grading conveyor and a rack for packing containers mounted at an elevation for ready access by the workmen beside the grading conveyor.

The machine of the present invention has a frame 10 supported by wheels 11 designed to roll upon the earth 12 at opposite sides of a windrow 13 containing sweet potatoes or other root crop beneath the surface of the earth. The frame 10 may be pulled or towed by means of a tow bar 14 adjustably carried on a bracket 15 attached to the under side member of the frame 10.

The tow bar 14 may be secured by a bolt 16 to a tractor hitch 17 of a tractor 18 having a power take-off 19 with a hydraulic system including a hose 20. In order to dig and unearth the sweet potatoes or other products from the windrow 13, a digging implement 21 is provided which tapers from each side to substantially a point and with a slightly concave upper surface. The rear or base portion 22 of the digger is rigidly attached by brackets 23 to the side guide members 24 and 25 of a conveyor structure pivotally supported at its upper end and for causing matter dug to pass rearwardly onto spaced cross bars 26 carried by parallel chains 27 which extend about lower sprockets 28 and upper sprockets 29. The rear portion 22 of the digger 21 extends in slightly overlying relation to the foraminous conveyor.

The lower sprockets 28 and upper sprockets 29 are mounted on shafts 30 and 31, respectively, carried by the side members 24 and 25 of the conveyor structure the shaft 31 being mounted in brackets 32 on the frame 10 so that the conveyor structure is pivoted about its upper end in order that the lower extending front end of the conveyor structure can move elevation-wise or float to follow the contour of the terrain 12 under the pressure and control of spaced pistons 33 from the hydraulic cylinders 34 supplied with fluid from the hydraulic system of the tractor through the line 20. Each hydraulic cylinder is pivotally mounted on a bracket 35 attached to a vertical member of the frame 10. The lower ends of the pistons 33 are secured by pivots 36 to the side guides 24 and 25. When the piston 33 is extended downwardly pressure is exerted on the lower end of the conveyor to retain it in proper relation to the earth. For transportation the pistons may be retracted to hold the digger at the lower end of the conveyor with the digger out of contact with the earth.

Beneath and in engagement with the chains 27 are spaced elliptical sprockets 37 on supporting shafts 38 so that as the chains 27 move they are given a vibratory motion so that any dirt will be shaken from the sweet potatoes 39. Additionally, guide rollers 40 are supported by shafts 41 for sustaining the chains 27, and in like manner guide rollers 42 supported on shaft 43 carried by brackets 44 are provided for supporting the lower rung of the conveyor and to take up slack in such lower rung.

Sweet potatoes carried upwardly by the bars 26 are discharged from the upper end of the first conveyor onto a transverse conveyor belt 45 having a series of spaced cross bars or pusher members 46, such belt being mounted on lower and upper shafts 47 and 48 mounted between side members 49, the belt 45 being driven as will be hereafter described. The sweet potatoes being carried transversely by the conveyor 45 will fall onto a horizontal grading conveyor belt 50 mounted parallel to conveyor structure 24–27, noting FIG. 2, mounted on spaced pulleys 51 on shafts 52 in take-up bearings 53 adjustable by means of screws 54. The shafts 52 are mounted on the opposite ends and between side plates 55.

Beneath and in contact with the lower run of the conveyor 50 intermediate its length is mounted a roller 56 which tapers from its transverse central portion of larger diameter to its end of smaller diameter, such roller likewise being mounted in bearings in adjacent side plates 55. The generally flat upper run of the conveyor is supported by angles 57 suitably attached to the side plates 55 and a pair of flexible side shields 58 are provided overlapping the edges of the conveyor 50, such side shields being secured to the side plates 55.

A storage rack 59 is mounted on the frame 10 overlying the first conveyor and a platform 60 is provided so that workmen can operate from both sides of the grading conveyor 50 and can reach boxes or containers on the rack 59.

The drive for the three conveyors is driven from the power take-off 19 of the tractor through universal couplings 61, 62, 63, 64 and 65 and telescoping shafts 66 and 67 and shaft 68 to a gear box 69 on the under side of the rack 59. From the gear box 69 there extends a shaft 70 with a sprocket 71 and a chain 72 which drive another sprocket 73 on the shaft 31 through the upper end of the first conveyor. A second sprocket 74 is fixed to the shaft 31 which drives through a chain 75 another sprocket 76 on a horizontal transverse shaft 77. The shaft 77 carried a sprocket 78 which drives a sprocket 79 by means of a chain 80. The sprocket 79 is mounted on a shaft 81 which extends into a gear box 82. Within the gear box 82 on the shaft 81 is located a bevel gear 83 which meshes with bevel gears 84 and 85. The gear 84 is fixed on a shaft 86 carrying a sprocket 87 which drives a chain 88 and a sprocket 89 fixed to the shaft 47 which drives the lower run of the transverse conveyor 45. The gear 85 is carried by a shaft 90 which drives the grading conveyor 50 through sprockets 91 and 92 and chain 93. If desired a canopy 94 may be removably mounted in openings 95 of the frame 10 (FIG. 1).

The second or transverse conveyor belt 45 is provided with adjustable take-ups similar to that of the second conveyor, as shown in FIG. 1. The cross rods 26 of the first conveyor are provided with a rubberoid coating 26' to prevent bruising the sweet potatoes. For similar purpose the second or transverse conveyor 45 and the grading conveyor 50 are provided with similar material.

Each of the cross bars 26 of the first conveyor is screwed into a square nut 27' which nut is welded to a link of the chain 27 at the side of the conveyor thus making it possible to replace any of the cross rods 26.

In the operation of the machine it is moved into position so that the blade or digger 21 will perform the digging operation unearthing the sweet potatoes whereupon they will pass rearwardly and be deposited on the upwardly inclined foraminous first conveyor being carried on and between the bars 26 thereof to which bars a vibratory motion is imparted by the elliptical sprockets 37 to remove any loose dirt. As the potatoes reach the upper end of the first conveyor they will be deposited onto the second or transverse conveyor 45 where they are carried by means of the pusher bars 46 to the grading conveyor 50 along which they pass and are inspected, graded, removed and placed in boxes or containers of any desired character (not shown) which have been previously stored in the rack 59, after which the containers of sweet potatoes may be transported, stored or handled in any other manner desired. Any encrustation or accumulation of dirt adhering to the inspection or grading conveyor 50 will be loosened and discharged by means of the roller 56 having a substantially large central diameter midway between its ends to cause flexing in the lower run of the conveyor belt 50.

It will be obvious to one skilled in the art that various changes may be made in the invention without departing from the spirit and scope thereof and therefore the invention is not limited by that which is illustrated in the drawings and described in the specification, but only as indicated in the accompanying claim.

What is claimed is:

A device of the character indicated comprising a wheel mounted generally rectangular frame, a first conveyor structure pivotally supported at its rear end on said frame, said conveyor structure extending the major portion of the length of said frame and having its front end disposed downwardly for raising and lowering movement thereof in accordance with the contour of the terrain, an excavating element mounted at the forward lower front end of said first conveyor structure for unearthing objects beneath the surface of the earth, said conveyor structure including unitary side members supporting spaced side chains and cross bars, means for imparting vibratory motion to said cross bars, means for pivoting said conveyor structure about its said rear end for raising and lowering the front end, a rack for packaging containers and of a size substantially to cover solely said conveyor structure, means mounting said rack above said conveyor, a generally horizontally disposed belt type grading conveyor mounted in said frame beside said first conveyor, an idler pulley having a central portion of a diameter substantially greater than that of its end portions, said idler pulley being supported in contact with said grading belt conveyor intermediate the ends thereof for flexing the same to effect loosening and removal of encrusted dirt or the like therefrom, a platform on said frame for supporting workmen beside said belt-type conveyor, transfer means between said first and grading conveyors, and means for the attachment of said device to a tractor for towing said frame and driving said conveyors from said tractor.

References Cited

UNITED STATES PATENTS

| | | | |
|---|---|---|---|
| 2,015,549 | 9/1935 | Dwyer et al. | 171—18 |
| 2,369,723 | 2/1945 | Denlinger | 171—130 X |
| 2,379,198 | 6/1945 | Templeton | 171—20 X |
| 2,468,639 | 4/1949 | Sample | 171—18 |
| 2,578,189 | 12/1951 | Johnston | 171—11 |

ABRAHAM G. STONE, *Primary Examiner.*

ANTONIO F. GUIDA, *Examiner.*